United States Patent
Fieldhouse et al.

(10) Patent No.: US 9,068,038 B2
(45) Date of Patent: Jun. 30, 2015

(54) EXTRUDABLE PRESSURE SENSITIVE ADHESIVE COMPOSITION AND METHODS FOR PREPARING THE SAME

(75) Inventors: John W. Fieldhouse, Naples, FL (US); Jiansheng Tang, Westfield, IN (US)

(73) Assignee: Firestone Building Products Company, LLC, Indianapolis, IN (US)

( * ) Notice: Subject to any disclaimer, the term of this patent is extended or adjusted under 35 U.S.C. 154(b) by 226 days.

(21) Appl. No.: 13/643,669

(22) PCT Filed: Apr. 28, 2011

(86) PCT No.: PCT/US2011/034270
§ 371 (c)(1),
(2), (4) Date: Mar. 7, 2013

(87) PCT Pub. No.: WO2011/137217
PCT Pub. Date: Nov. 3, 2011

(65) Prior Publication Data
US 2013/0165583 A1   Jun. 27, 2013

Related U.S. Application Data

(60) Provisional application No. 61/329,207, filed on Apr. 29, 2010.

(51) Int. Cl.
| | | |
|---|---|---|
| C08J 3/20 | (2006.01) |
| C08F 36/08 | (2006.01) |
| C08G 18/54 | (2006.01) |
| C08L 23/22 | (2006.01) |
| C09J 175/04 | (2006.01) |
| C08L 75/04 | (2006.01) |

(52) U.S. Cl.
CPC ............. *C08F 36/08* (2013.01); *C08G 18/542* (2013.01); *C08L 23/22* (2013.01); *C09J 175/04* (2013.01); *C08L 75/04* (2013.01); *C08G 2170/40* (2013.01)

(58) Field of Classification Search
CPC ................................. C08L 75/04; C08L 23/22
USPC .......................................................... 523/351
See application file for complete search history.

(56) References Cited

U.S. PATENT DOCUMENTS

| | | | |
|---|---|---|---|
| 3,654,005 A * | 4/1972 | Higgins et al. ................ 156/108 |
| 4,555,552 A | 11/1985 | Coran et al. | |
| 4,855,172 A | 8/1989 | Chiu | |
| 5,086,103 A * | 2/1992 | Blizzard et al. ............... 524/188 |
| 5,221,785 A | 6/1993 | Ando et al. | |
| 5,232,531 A | 8/1993 | Dammann et al. | |
| 5,242,727 A | 9/1993 | Briddell et al. | |
| 5,374,666 A | 12/1994 | Tamano et al. | |
| 5,504,136 A | 4/1996 | Davis et al. | |
| 5,985,981 A | 11/1999 | Alexander et al. | |
| 2005/0209425 A1* | 9/2005 | Treiber et al. .................. 528/44 |
| 2007/0000926 A1 | 1/2007 | Jacob et al. | |
| 2013/0302550 A1* | 11/2013 | Tang et al. ................... 428/40.9 |

FOREIGN PATENT DOCUMENTS

| | | |
|---|---|---|
| EP | 0924278 A1 | 6/1999 |
| EP | 1739127 A1 | 1/2007 |
| GB | 2261221 A | 5/1993 |
| JP | 2003-049023 A | 2/2003 |
| WO | 9303914 A1 | 3/1993 |

OTHER PUBLICATIONS

International Report on Patentability dated Oct. 30, 2012 for International Appl. No. PCT/US2011/034270; 6 pages.
International Search Report dated Jul. 20, 2011 for International Appl. No. PCT/US2011/034270; 3 pages.

\* cited by examiner

*Primary Examiner* — Hannah Pak
(74) *Attorney, Agent, or Firm* — Jason A. Houser; Arthur M. Reginelli (57) ABSTRACT

A phase-separated polymeric composition comprising a first phase including polyurethane domains; and a second phase including a butyl rubber matrix.

14 Claims, 2 Drawing Sheets

EXTRUDABLE PRESSURE SENSITIVE ADHESIVE COMPOSITION AND METHODS FOR PREPARING THE SAME

This application is the national-stage application of International Application Serial No. PCT/US11/34270, filed on Apr. 28, 2011, which claims the benefit of U.S. Provisional Application Ser. No. 61/329,207, filed on Apr. 29, 2010, which is incorporated herein by Reference

FIELD OF THE INVENTION

Embodiments of the present invention are directed toward extrudable pressure sensitive adhesive compositions and methods for making the same; the compositions are particularly useful as a seaming tape for polymeric roofing membranes.

BACKGROUND OF THE INVENTION

Flat or low-sloped roofs are often covered with polymeric membranes, which protect the roof from environmental impact such as snow and rain.

These polymeric membranes are typically manufactured and shipped in widths that are narrower than the roof surface to which they are installed. Accordingly, multiple membranes are often installed, and adjacent membranes are seamed together.

Pressure sensitive seam tapes are often employed for this purpose. Specifically, a pressure sensitive seam tape is applied to one surface of a membrane along a longitudinal edge and an adjacent membrane is mated along its longitudinal edge to the top surface of the pressure sensitive seam tape to thereby form a seam.

Technologically useful pressure-sensitive seam tapes employed in the industry include cured or partially cured rubber. For example, U.S. Pat. No. 4,855,172 teaches an adhesive tape comprising cured butyl rubber. The rubber can be cross-linked with a bromomethylated phenolic resin and zinc oxide. The composition is typically manufactured by extruding a layer of green or uncured rubber to a coated release paper, rolling the extrudate and release paper, and then subjecting it to curing conditions for a specified period of time (e.g., one day at 70° C.). Similarly, U.S. Pat. No. 5,242,727 teaches a pressure-sensitive adhesive tape composition including a blend of an ethylene-propylene-diene terpolymer, a halogenated butyl rubber, polyisobutylene, a phenolic resin, zinc oxide, and a sulfur-based cure system. After the composition is extruded onto a release liner, it is heated to a temperature of about 100° C. for a period of two-six hours to achieve the desired cross-linking of the rubber.

While these pressure-sensitive adhesive tapes have proven to be technologically useful, they suffer from several drawbacks. First, they require significant cure time, which reduces manufacturing efficiencies and increases costs. Also, due to the level of curing, the compositions behave as thermoset materials and are therefore not reprocessable.

There is therefore a desire for pressure-sensitive adhesive tape compositions that are more easily manufactured, are reprocessable, and demonstrate the performance characteristics that have come to be expected from cured butyl rubber systems.

SUMMARY OF THE INVENTION

One or more embodiments of the present invention provide a phase-separated polymeric composition comprising a first phase including polyurethane domains; and a second phase including a butyl rubber matrix.

Still other embodiments of the present invention provide a method for producing a polymeric composition, the method comprising providing a halogenated butyl rubber including one or more halogen atoms and one or more double bonds deriving from isoprene; partially cross-linking the butyl rubber by displacement of two or more of the halogen atoms by a metal oxide; chemically binding a phenolic resin across one or more of the double bonds to provide the butyl rubber with a hydroxyl functionality; chemically binding an isocyanate to at least one hydroxyl functionality of the butyl rubber to form a butyl rubber/urethane macromolecule; and forming a polyurethane in the presence of the butyl rubber/urethane macromolecule.

Still other embodiments of the present invention provide a method for producing a polymeric composition, the method comprising charging halogenated butyl rubber to a reaction extruder; charging a first phenolic resin to the reaction extruder, where the first phenolic resin includes functionality for reacting with double bonds located on the butyl rubber; charging a second phenolic resin that is substantially devoid of functionality for reacting with double bonds located on the butyl rubber; charging a metal oxide to the reaction extruder; charging a catalyst to promote a reaction between the butyl rubber and the first phenolic resin to the reaction extruder; mixing said halogenated butyl rubber, said first phenolic resin, said metal oxide, and said catalyst to promote the reaction between the butyl rubber and the first phenolic resin to thereby partially crosslinking the rubber and functionalizing the rubber with the first phenolic resin; charging a isocyanate to the reaction extruder; and mixing said partially crosslinked rubber, said phenolic resin, and said catalyst to thereby form a polyurethane dispersed within butyl rubber.

Still other embodiments of the present invention provide a method for producing a polymer composition, the method comprising providing a masterbatch composition that is prepared by combining a halogenated butyl rubber with a phenolic resin; introducing the masterbatch composition to a reactor; introducing to the reactor an isocyanate and a catalyst for forming a polyurethane to form a blend; and subjecting the blend to conditions sufficient to form a polyurethane.

DETAILED DESCRIPTION OF ILLUSTRATIVE EMBODIMENTS

Embodiments of the present invention are directed toward pressure-sensitive adhesive compositions that include polyurethane domains dispersed within a butyl rubber matrix. In one or more embodiments, the polyurethane may be formed by reacting an isocyanate with a phenolic resin. And, the butyl rubber may be partially crosslinked and may be reacted or functionalized with a phenolic resin.

In one or more embodiments, the composition may be produced by providing a partially-crosslinked butyl rubber and forming a polyurethane in the presence of the partially-crosslinked butyl rubber. In one or more embodiments, the partially-crosslinked butyl rubber may be produced by combining a halogenated butyl rubber with a phenolic resin (e.g. a first phenolic resin) and optionally a metal catalyst. The polyurethane is formed in the presence of the partially-crosslinked butyl rubber by reacting an isocyanate with the first phenolic resin and/or a second phenolic resin in the presence of a catalyst for the polyurethane. Processing oil may be added to the composition, along with other conventional additives, at various stages of the process. In particular embodiments, the compositions can be manufactured continuously within a reactive extruder.

Ingredients

In preparing the compositions of the present invention, one or more of the following ingredients may be employed.

In one or more embodiments, butyl rubber includes copolymers and terpolymers of isobutylene and at least one other comonomer. Useful comonomers include isoprene, divinyl aromatic monomers, alkyl substituted vinyl aromatic monomers, and mixtures thereof. Exemplary divinyl aromatic monomers include vinyl styrene. Exemplary alkyl substituted vinyl aromatic monomers include α-methyl styrene and paramethyl styrene. These copolymers and terpolymers may also be halogenated such as in the case of chlorinated and brominated butyl rubber. In one or more embodiments, these halogenated polymers may derive from monomer such as parabromomethylstyrene.

In one embodiment, where butyl rubber includes an isobutylene-isoprene copolymer, the copolymer may include from about 0.5 to about 30, or in other embodiments from about 0.8 to about 5, percent by weight isoprene based on the entire weight of the copolymer with the remainder being isobutylene.

In the case of halogenated butyl rubbers, the butyl rubber may include from about 0.1 to about 10, or in other embodiments from about 0.3 to about 7, or in other embodiments from about 0.5 to about 3 percent by weight halogen based upon the entire weight of the copolymer or terpolymer.

In one or more embodiments, the glass transition temperature (Tg) of useful butyl rubber can be less than about −55° C., or in other embodiments less than about −58° C., or less than about −60° C., or in other embodiments less than about −63° C.

In one or more embodiments, the Mooney viscosity ($ML_{1+8}$@125° C.) of useful butyl rubber can be from about 25 to about 75, or in other embodiments from about 30 to about 60, or in other embodiments from about 40 to about 55.

Useful butyl rubber includes those prepared by polymerization at low temperature in the presence of a Friedel-Crafts catalyst as disclosed within U.S. Pat. Nos. 2,356,128 and 2,944,576, which are incorporated herein by reference. Other methods may also be employed.

Butyl rubber can be obtained from a number of commercial sources as disclosed in the Rubber World Blue Book. For example, halogenated copolymers of isobutylene and isoprene are available under the tradename Exxon Butyl™ (ExxonMobil Chemical Co.), halogenated and un-halogenated copolymers of isobutylene and paramethyl styrene are available under the tradename EXXPRO™ (ExxonMobil Chemical Co.), star branched butyl rubbers are available under the tradename STAR BRANCHED BUTYL™ (ExxonMobil Chemical Co.), and brominated isobutylene-isoprene copolymer with high Mooney viscosity is available under the tradename Lanxess Bromobutyl X2 (Lanxess, Inc.).

The first phenolic resin includes a functionalized phenolic resin, which refers to a phenolic resin including one or more functionality for reacting with double bonds located within butyl rubber. In general, the term phenolic resin refers to the reaction products of a phenol or substituted phenol with an aldehyde such as formaldehyde. The first phenolic resin may also be referred to as a reactive or functionalized phenolic resin.

In one or more embodiments, the functionality for reacting with double bonds within butyl rubber include, but are not limited to, halogen atoms, halogenated hydrocarbyl groups, and hydroxyl or carboxyl-containing hydrocarbyl group. Where the functionality is a hydroxyl group, those skilled in the art will appreciate that this hydroxyl functionality is distinct from the hydroxyl functionality directly attached to a phenol ring of the resin.

In one or more embodiments, the reactive phenolic resins may include those defined according to the general formula where each $R^1$ is independently a divalent organic group, each $R^2$ is independently a monovalent organic group, each X is independently a functional group or monovalent organic group containing a functional group, and m is an integer from 0 to 20.

In one or more embodiments, mono-valent organic groups may include hydrocarbyl groups or substituted hydrocarbyl groups such as, but not limited to, alkyl, cycloalkyl, alkenyl, cycloalkenyl, aryl, allyl, aralkyl, alkaryl, or alkynyl groups. Substituted hydrocarbyl groups include hydrocarbyl groups in which one or more hydrogen atoms have been replaced by a substituent such as an alkyl group. In one or more embodiments, these groups may include one, or the appropriate minimum number of carbon atoms to form the group, to 20 carbon atoms. These groups may contain heteroatoms such as, but not limited to, nitrogen, boron, oxygen, silicon, sulfur, tin, and phosphorus atoms.

In one or more embodiments, divalent organic groups may include hydrocarbylene groups or substituted hydrocarbylene groups such as, but not limited to, alkylene, cycloalkylene, alkenylene, cycloalkenylene, alkynylene, cycloalkynylene, or arylene groups. Substituted hydrocarbylene groups include hydrocarbylene groups in which one or more hydrogen atoms have been replaced by a substituent such as an alkyl group. In one or more embodiments, these groups may include one, or the appropriate minimum number of carbon atoms to form the group, to 20 carbon atoms. These groups may also contain one or more heteroatoms such as, but not limited to, nitrogen, oxygen, boron, silicon, sulfur, tin, and phosphorus atoms.

In one or more embodiments, the divalent organic groups may include ether groups. For example, $R^1$ may include a group defined by the formula

—$CH_2$—O—$CH_2$—

In particular embodiments, each $R^1$ is a divalent ether group having the formula —$CH_2$—O—$CH_2$—, m is an integer from 0 to 10, each $R^2$ is a monovalent organic group having 12 or less carbon atoms, and X is a bromomethyl group or methylol group.

In one or more embodiments, at least 50%, in other embodiments at least 95%, and in other embodiments at least 99% of the monovalent organic groups $R^2$ are located in the para position. In these or other embodiments, at least 50%, in other embodiments at least 95%, and in other embodiments at least 99% of the monovalent organic groups $R^2$ are branched alkyl group; for example, branched monovalent organic group, which also may be referred to as sterically hindered monovalent organic groups, may include tert-butyl groups, neo-pentyl groups, and tert-octyl groups.

In one or more embodiments, the functional group X may be a halogen atom selected from the group consisting of bromine, chlorine, and iodine. In other embodiments, the functional group X may be a halogen-containing monovalent organic group such as, but not limited to, a chloromethyl group or bromomethyl group. In other embodiments, the functional group X may be an alkylol group such as a methylol group, a propylol group, a butylol group, or a pentylol group.

In one or more embodiments, the first phenolic resin is a resole resin, which can be made by the condensation of alkyl substituted phenols or unsubstituted phenols with aldehydes, such as formaldehyde, in an alkaline medium or by condensation of bi-functional phenoldialcohols.

Functionalized phenolic resins may be obtained under the tradenames SP-1044, SP-1045, and SP-1055 (Schenectady International; Schenectady, N.Y.). SP-1045 is believed to be an octylphenol-formaldehyde resin that contains terminal methylol groups. SP-1055 is believed to be an octylphenol-formaldehyde resin that contains terminal bromomethyl groups.

The second phenolic resin is devoid or substantially devoid of terminal functional groups. In one or more embodiments, the second phenolic resin is unreactive or substantially unreactive with butyl rubber, and therefore the second phenolic resin may also be referred to as unfunctionalized or unreactive phenolic resin.

In one or more embodiments, the unreactive phenolic resin may include those defined by the formula where each $R^3$ is independently a divalent organic group, each $R^2$ is independently a monovalent organic group, and m is an integer from 0 to 20.

In one or more embodiments, each $R^3$ is devoid of heteroatoms. In these or other embodiments, each $R^2$ is devoid of heteroatoms. In these or other embodiments, each $R^2$ is a sterically hindered or highly branched alkyl group. In one or more embodiments, each phenol substituent within the resin may include further substitution (i.e, one or more hydrogen atoms attached to the phenol ring may be replaced with an alkyl group); the substituents that form the substituted phenol are devoid of heteroatoms.

In one or more embodiments, the second phenolic resin is a resole resin, which can be made by the condensation of alkyl, substituted phenols, or unsubstituted phenols with aldehydes such as formaldehyde in an alkaline medium or by condensation of bi-functional phenoldialcohols. In one or more embodiments, this condensation reaction occurs in the excess or molar equivalent of formaldehyde. In other embodiments, the second phenolic resin may be formed by an acid-catalyzed reaction.

Unfunctionalized phenolic resins may be obtained under the tradename SP-1068 (Schenectady International; Schenectady, N.Y.). SP-1068 is believed to be an octylphenol-formaldehyde resin that is devoid or substantially devoid of terminal functional groups such as halogen atoms or methylol groups.

In one or more embodiments, useful isocyanates include aromatic polyisocyanates such as diphenyl methane diisocyanate in the form of its 2,4'-, 2,2'-, and 4,4'-isomers and mixtures thereof, the mixtures of diphenyl methane diisocyanates (MDI) and oligomers thereof known in the art as "crude" or polymeric MDI having an isocyanate functionality of greater than 2, toluene diisocyanate in the form of its 2,4' and 2,6'-isomers and mixtures thereof, 1,5-naphthalene diisocyanate, and 1,4' diisocyanatobenzene. Exemplary isocyanate components include polymeric Rubinate 1850 (Huntsmen Polyurethanes), Rubinate 9433 (Huntsmen Polyurethanes), polymeric Lupranate M70R (BASF), and polymeric Mondur 489N (Bayer).

In one or more embodiments, the metal catalysts may be metal oxides that may be employed to crosslink the halogenated butyl rubber include alkali metal oxides, alkali earth metal oxides, and transition metal oxides. In particular embodiments, the metal oxide is magnesium oxide, and in other embodiments the metal oxide is calcium oxide. While it is believed that the metal oxide reacts with the halogen atom of the halogenated butyl rubber to form crosslinks, the metal oxide may also serve to catalyze a reaction between the halogenated butyl rubber and the reacted phenolic resin. In other embodiments, the metal catalyst may be an organometal such as magnesium resinate.

In one or more embodiments, the catalyst for polyurethane, which may also be referred to as polyurethane catalyst, which is believed to promote a reaction between the unfunctionalized phenolic resin and the isocyanate, is an amine compound. Useful amine compounds include those that promote a reaction between a polyol and an isocyanate (which is known as a gel reaction), those that promote a reaction between water and icocyanate (which is known as a blow reaction), and those catalysts that promote isocyanate trimerization. Exemplary amine catalysts include triethylenediamine (TEDA), dimethylcyclohexylamine (DMCHA), dimethylethanolamine (DMEA), tetramethylbutanediamine (TMBDA), pentamethyldipropylenetriamine, N-(3-dimethylaminopropyl)-N,N-diisopropanolamine, 1,3,5-(tris(3-dimethylamino)propyl)-hexahydro-s-triazine, bis-(2-dimethylaminoethyl)ether, N-ethylmorpholine, triethylamine (TEA), 1,8-diazabicyclo[5.4.0]undecene-7 (DBU), pentamethyldiethylenetriamine (PMDETA), benzyldimethylamine (BDMA), pentamethyldiethylene triamine (PMDETA), 2,4,6-tris[(dimethylamino)methyl]phenol, tributyl amine, N-methyl morpholine, and N-ethyl morpholine.

In one or more embodiments, the compositions of the present invention may include oil, which may also be referred to as processing oil or extender oil. These extenders may include high-boiling hydrocarbons. Examples of these oils include paraffinic oils, aromatic oils, naphthenic oils, vegetable oils, and low PCA oils including MES, TDAE, and SRAE, and heavy naphthenic oils, and various synthetic oils such as, but not limited, polybutene oils. In one or more embodiments, the oil employed is selected based upon its compatibility with the rubber, as well as its ability to provide advantageous properties to the final composition (e.g., green strength or tack).

In particular embodiments, a polybutene oil is employed. Useful polybutene oils include high-viscosity oils that may be characterized by a viscosity at 100° C. of at least 80 cst, in other embodiments at least 100 cst, or in other embodiments at least 120 cst up to, for example, about 700 or 800 cst. In these or other embodiments, the high viscosity polybutene oils may be characterized by a molecular weight of at least 1000 g/mole, in other embodiments at least 1200 g/mole, or in other embodiments at least 1300 g/mole up to, for example, 1400 or 1500 g/mole. An exemplary high-viscosity polybutene oil is available under the tradename Indapol H300 (Ineos) or PB32 (Soltex).

In these or other embodiments, oils or extenders may be used as carriers for one or more of the various ingredients employed in preparing the compositions. When used as a carrier, the oils may, especially where it may be disadvantageous to heat the oil (e.g., when used as a carrier for a catalyst), include low viscosity or low molecular weight oils. In other words, where a low molecular weight or low viscosity oil is employed, the oil, along with the constituent that it carries, can be injected into the composition without heating. Exemplary low-viscosity oils may be characterized by a viscosity at 100° C. of less than 80 cst, in other embodiments less than 70 cst, or in other embodiments less than 60 cst. In these or other embodiments, these low-viscosity oils may be characterized by a molecular weight of less than 100 g/mole, or in other embodiments less than 700 g/mole. An exemplary low-viscosity oil is a polybutene oil available under the tradename Indapol H25 (Ineos).

Other oils that may be employed include carriers for the isocyanate component. That is, because the solubility of the isocyanate may be distinct from other components of the composition, particular oils or carriers may need to be selected. In particular embodiments, aromatic oils are used as carriers for the isocyanate component. An exemplary aromatic oil includes that of available under the tradename HB40 (Solutia). Other useful oils include Ruetasolv DI (Rutgers), which is a diisopropyl naphthalene, which is advantageously both a low-viscosity oil and an oil that is compatible with the isocyanate.

In one or more embodiments, the compositions of the present invention may include fillers or pigments such as an organic filler and/or inorganic filler. Useful organic fillers include carbon blacks, coal filler, and ground recycled rubber. Useful inorganic fillers include clays, talc, mica, titanium dioxide, calcium carbonate, and silica.

In one or more embodiments, useful carbon blacks include those generally characterized by average industry-wide target values established in ASTM D-1765. Exemplary carbon blacks include GPF (General-Purpose Furnace), FEF (Fast Extrusion Furnace), and SRF (Semi-Reinforcing Furnace). One particular example of a carbon black is N650 GPF Black, which is a petroleum-derived reinforcing carbon black having an average particle size of about 60 nm and a specific gravity of about 1.8 g/cc. Another example is N330, which is a high abrasion furnace black having an average particle size about 30 nm, a maximum ash content of about 0.75%, and a specific gravity of about 1.8 g/cc.

Useful clays include hydrated aluminum silicates. In one or more embodiments, useful clays can be represented by the formula $Al_2O_3SiO_2 \cdot XH_2O$. Exemplary forms of clay include kaolinite, montmorillonite, atapulgite, illite, bentonite, halloysite, and mixtures thereof. In one embodiment, the clay is represented by the formula $Al_2O_3SiO_2 \cdot 3H_2O$. In another embodiment, the clay is represented by the formula $Al_2O_3SiO_2 \cdot 2H_2O$. In a preferred embodiment, the clay has a pH of about 7.0.

Useful talc include hydrated magnesium silicate. In one or more embodiments, talc can be represented by the formulae $Mg_3Si_4O_{10}(OH)_2$ or $3MgO \cdot 4SiO_2 \cdot H_2O$. Exemplary forms of talc include talcum, soapstone, steatite, cerolite, magnesium talc, steatite-massive, and mixtures thereof. Talc filler may contain various other minerals such as dolomite, chlorite, quartz, and the like. Talc used as filler may also exhibit characteristics such as hydrophobicity, organophilicity, non-polarity, and chemically inertness. In one embodiment, the talc has a specific gravity of from about 2.6 to about 2.8, a pH of from about 7.0 to 8.7, a refractive index of about 1.57 at 23° C., and a moisture content of less than about 0.5 weight percent. A representative talc is Talc 9107, which is available from Polar Minerals (Mt. Vernon, Ind.), which is non-abrasive, chemically inert, has a specific gravity of about 2.8, a pH of about 8.7, a refractive index of about 1.57 at 23° C., and a moisture content of less than about 0.3 weight percent.

In addition to the foregoing constituents, the membranes of this invention may also optionally include homogenizing agents, processing aids such as waxes, flame retardants, zinc oxide, stearic acid, antioxidants, antiozonants, processing additives, fillers, such as reinforcing and non-reinforcing carbon blacks, and mixtures thereof. Certain embodiments may be substantially devoid of any of these constituents.

Preparation of Composition

In one or more embodiments, the adhesive compositions may prepared by providing a partially-crosslinked butyl rubber and forming a polyurethane in the presence of the partially-crosslinked butyl rubber. In one embodiment, the adhesive compositions are prepared in a continuous process that may also be referred to as an in-line process. In other embodiments, the adhesive compositions are prepared by a two-step process that may also be referred to as a masterbatch process. In either embodiment, the partially-crosslinked butyl rubber may be formed by combining a halogenated butyl rubber with a phenolic resin. The polyurethane is formed in the presence of the partially-crosslinked butyl rubber by reacting an isocyanate with a phenolic resin in the presence of a polyurethane catalyst. In one or more embodiments, the polyurethane in formed under conditions of mixing including, but not limited to, high shear mixing.

Where an in-line process is employed, the partially-crosslinked butyl rubber is formed by combining a halogenated butyl rubber with a first phenolic resin. The combination of the halogenated butyl rubber and the first phenolic resin takes place within a reactor (e.g., extrusion reactor) wherein the polyurethane is formed. Within this process, the halogenated butyl rubber and the first phenolic resin (which is a reactive resin) are combined in the presence of a metal catalyst (e.g., metal oxide) that is employed for assisting in the crosslinking of the rubber.

In one or more embodiments, the butyl rubber may be at least partially crosslinked through interaction or reaction with the first phenolic resin (i.e., functionalized phenolic resin), the metal catalyst (e.g., metal oxide), or both. Without wishing to be bound by any particular theory, it is believed that crosslinks are formed between double bonds located on the butyl rubber through a reaction with the first phenolic resin and between halogen sites located on the butyl rubber through a reaction or interaction with the metal catalyst (e.g., metal oxide). In one or more embodiments, the reaction between the first phenolic resin and the butyl rubber takes place in the presence of the metal catalyst (e.g., metal oxide), which may also serve to catalyze the reaction between the first phenolic resin and the double bonds of the butyl rubber.

In one or more embodiments, the polyurethane is formed by reacting an isocyanate with hydroxyl groups of a second phenolic resin and optionally hydroxyl groups of the first phenolic resin. It is believed that the isocyanate may react with terminal hydroxyl groups or hydroxyl groups attached directly to the phenyl ring of the phenolic resins. Without wishing to be bound by any particular theory, it is believed that the first phenolic resin may react with both the butyl rubber and the isocyanate (i.e., take part in the polyurethane reaction) and thereby chemically link polyurethane to butyl rubber.

Figure 1:
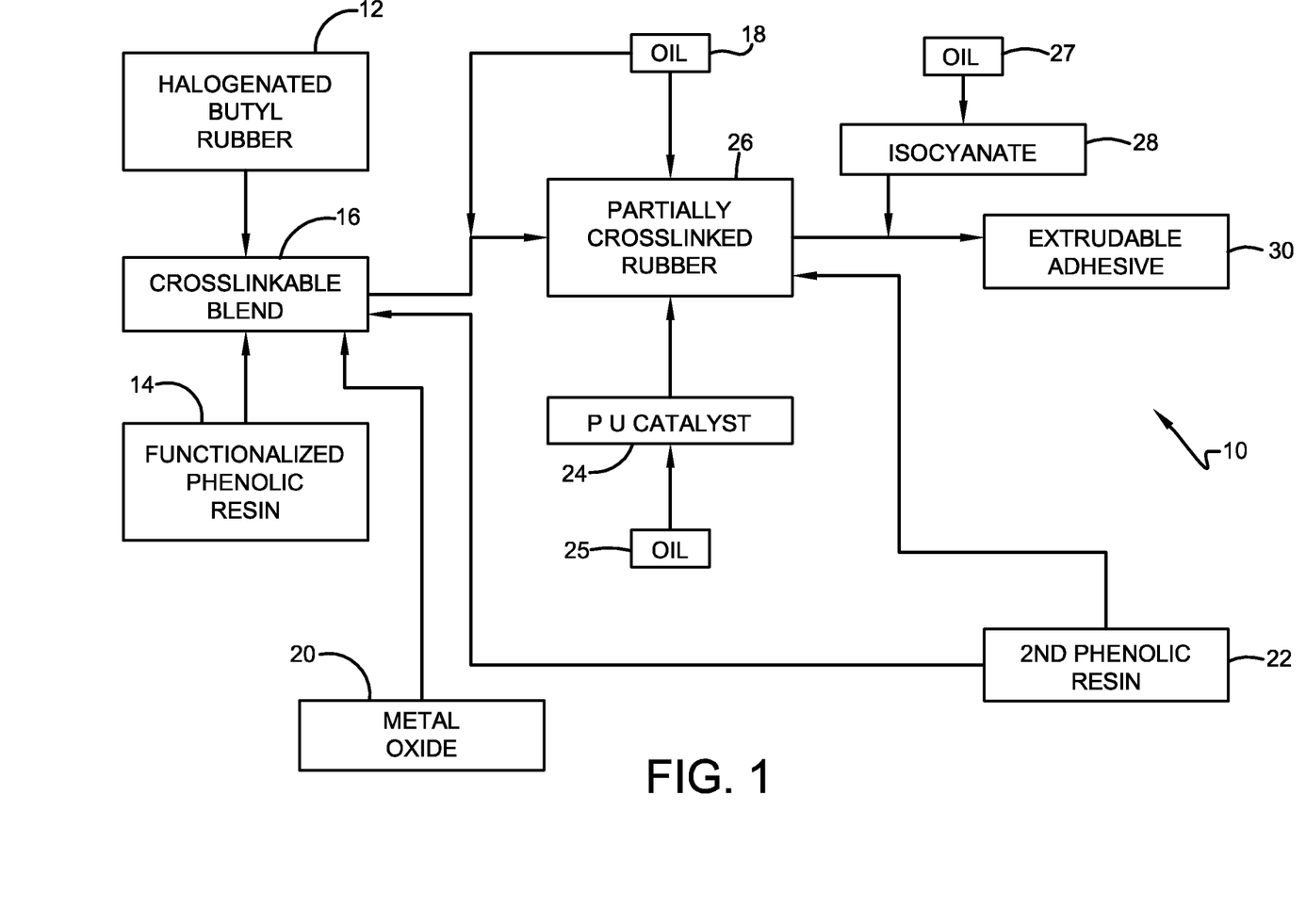
FIG. 1 is a flow chart showing a process for preparing compositions of one or more embodiments of the present invention.

In one or more embodiments, a reaction scheme for preparing the adhesive composition within an in-line process can be described with reference to FIG. 1. The process 10 includes introducing halogenated butyl rubber 12 with the first (functionalized) phenolic resin 14 to form a crosslinkable blend 16. The crosslinkable blend 16 may be prepared in the presence of a metal catalyst 20. An oil 18 (e.g. high-viscosity polybutene oil) may be added to blend 16 after its formation.

Crosslinkable blend 16 is then crosslinked in the presence of the functionalized phenolic resin 14 and/or metal oxide 20, as well as any of the other ingredients that may optionally be present during the crosslinking step, to form partially-crosslinked rubber 26. In particular embodiments, polyurethane catalyst 24 is added to partially crosslinked rubber 26 after its formation. Polyurethane catalyst 24 may be carried by carrier oil 25 (e.g., low viscosity oil). Oil 18 may also be introduced after formation of partially crosslinked rubber 26.

In one or more embodiments, isocyanate 28 is introduced to the partially-crosslinked rubber 26 following introduction and mixing of polyurethane catalyst 24. In particular embodiments, isocyanate 28 is pre-blended in an oil 27 (e.g. aromatic oil) prior to introduction with partially crosslinked rubber 26. Isocyanate 28 reacts with functionalized phenolic resin 14 and/or second phenolic resin 22 in what is believed to be a polyurethane reaction in the presence of partially crosslinked butyl rubber 26 to form extrudable adhesive 30. In one or more embodiments, second phenolic resin 22 can be introduced to crosslinkable blend 16 before or after formation of the partially crosslinked rubber 26

In one or more embodiments, the step of partially crosslinking the butyl rubber takes place at a temperature of from about 82.2° C. to about 132° C., in other embodiments from about 93.3° C. to about 124° C., and in other embodiments from about 98.9° C. to about 113° C.

In one or more embodiments, after forming the partially-crosslinked butyl rubber 26, the temperature of the composition may be increased (or allowed to increase). For example, after formation of partially-crosslinked butyl rubber 26 and before the introduction of isocyanate 28, the temperature of the composition may be increased from about −12° C. to about 0° C., or in other embodiments from about −9.4° C. to about −3.9° C., over the temperature of the composition during partial crosslinking of the rubber.

In these or other embodiments, after the step of reacting isocyanate 28 to form a polyurethane in the presence of partially crosslinked butyl rubber 26 takes place, the temperature of the composition may be reduced prior to exiting the extruder. For example, the temperature may be cooled to about 82.2° C. to about 104° C., and in other embodiments from about 87.8° C. to about 98.9° C.

In other embodiments, the halogenated butyl rubber and an unfunctionalized phenolic resin (e.g. the second phenolic resin) may be combined in a separate reactor and thereby form a masterbatch that is subsequently delivered to a reactor where the polyurethane is formed. In other words, the masterbatch can be prepared by reacting the halogenated butyl rubber with an un-functionalized phenolic resin (i.e., the second phenolic resin described above). It has advantageously been discovered that when the halogenated butyl rubber and second phenolic resin (i.e., un-functionalized phenolic resin) are combined and given adequate time to react, a partially-crosslinked butyl rubber can be formed in the absence of a metal oxide and/or without the use of a functionalized phenolic resin. The masterbatch can be prepared in any conventional batch-mixing equipment such as a sigma-blade mixer, a Banbury mixer or a Brabender mixer.

The reaction between the un-functionalized phenolic resin (e.g. second phenolic resin) and the halogenated butyl rubber may take place at a temperature of from about 76.7° C. to about 116° C. or in other embodiments from about 82.2° C. to about 104° C. In particular embodiments, the reaction time for forming the masterbatch may be from about 1 to about 10 minutes or in other embodiments from about 3 to about 6 minutes under mixing conditions.

Once the masterbatch of the partially-crosslinked butyl rubber is prepared, the partially-crosslinked butyl rubber can be transferred to a second reactor wherein the polyurethane is formed in the presence of the partially-crosslinked butyl rubber. For example, the partially-crosslinked butyl rubber can be transferred to a reaction extruder wherein the polyurethane is formed. Together with the partially-crosslinked butyl rubber, additional un-functionalized phenolic resin (i.e., second phenolic resin) can be charged to the reactor. Then, in a manner similar to the in-line procedure, polyurethane catalyst and isocyanate can be charged to the reactor to form the polyurethane in the presence of the partially-crosslinked butyl rubber.

A variety of rubber and/or plastic processing equipment can be employed in the in-line process, as well as the masterbatch process. For example, the compositions can be prepared in continuous-mixing apparatus such as twin-screw or planetary extruders. In a particular embodiment, the composition is prepared within a continuous extruder. The extruder can have dimensions, in terms of length to diameter (L/D), of at least 40/1, in other embodiments at least 45/1, and in other embodiments equal to or at least 50/1. As in generally known in the art, extruders of this nature (which may also be referred to as reaction extruders), may include a plurality of barrels, and within each barrel two or more screws may be positioned. These screws can be equipped with a variety of screw elements, which elements can accomplish a variety of mixing parameters including, without limitation, conveying, high intensity mixing, kneading, and backmixing. Each barrel can be heated or cooled as desired, ingredients can be added at one or more barrels, and gases can be removed at one or more barrels.

Figure 2:
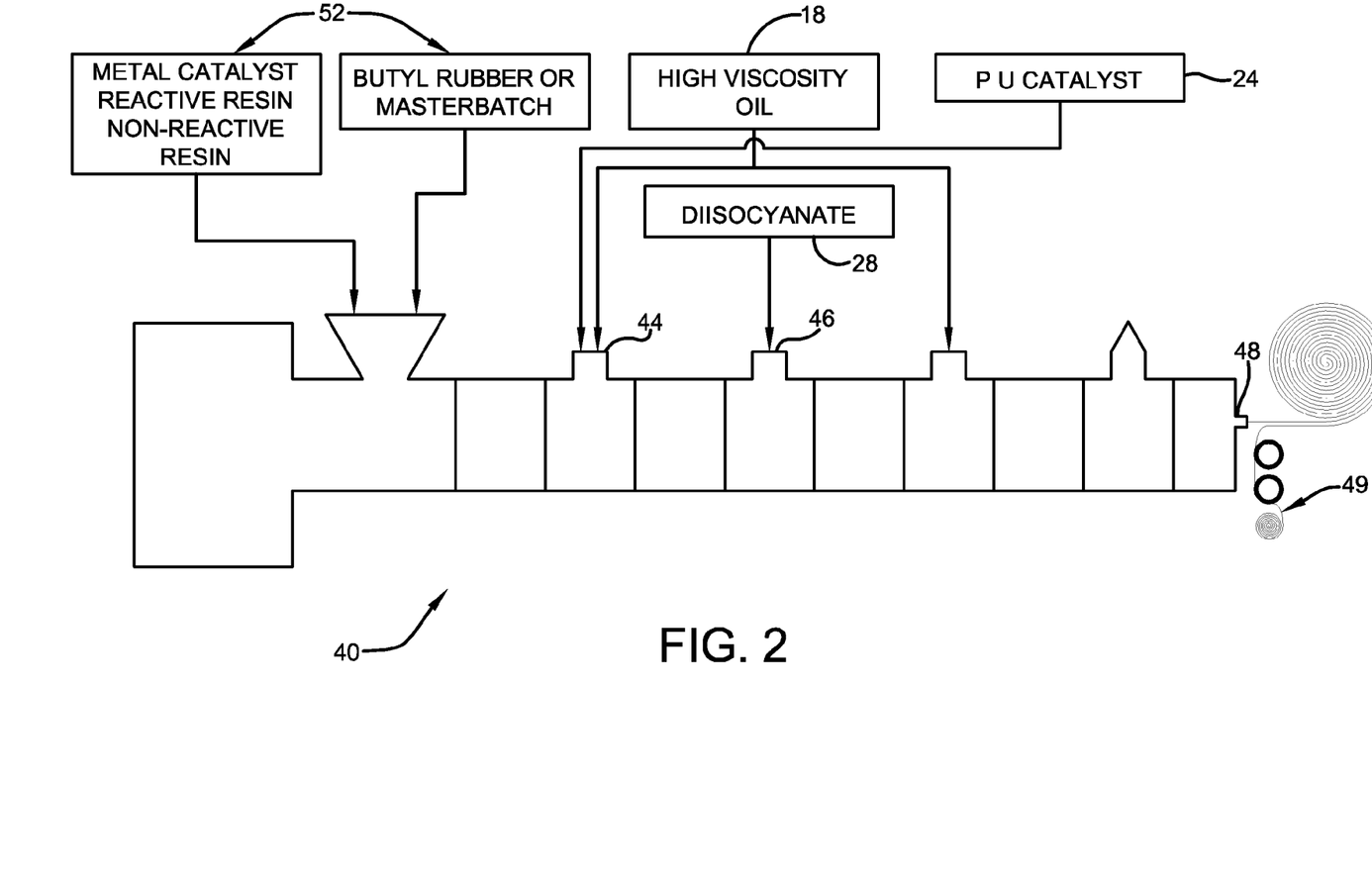
FIG. 2 is a schematic showing a process for making compositions of one or more embodiments of the invention within a continuous extruder.

FIG. 2 shows exemplary extruder 40. In one or more embodiments, the solid ingredients 52, such as halogenated butyl rubber 12, functionalized phenolic resin 14, metal oxide 20, and unfunctionalized phenolic resin 22, are introduced in the feed throat 42 of extruder 40. The pelletized ingredients may be added by way of a pellet feeder and the powdered ingredients may be added by way of a powder feeder. These ingredients are mixed and a temperature of about 82.2° C. to about 93.3° C. is maintained for about the first ⅖ (i.e. about 24 L/D) of the extruder to at least partially crosslink the rubber in the case of the in-line process. The polyurethane catalyst 24 (e.g. dispersed within a carrier oil) is then introduced at a downstream injection point 44, which may be at a barrel located at about 24 L/D, and mixing is continued for about another 12 L/D to disperse the polyurethane catalyst in the partially crosslinked rubber. Together with the introduction of polyurethane catalyst 24 or shortly thereafter, the temperature of the composition may be increased (e.g. 93.3° C.-121° C.). The isocyante 28 is then introduced (e.g. dispersed within a carrier oil) at a subsequent injection point 46, which may be at a barrel located at about 36 L/D, and mixing is continued for about another 12 L/D to form extrudable adhesive 30. Following introduction of the isocyanate and initial formation of the polyisocyanate, the temperature of the composition may be reduced (e.g., 82.2-104° C.) in order to facilitate further processing of the composition after leaving the extruder (e.g., placing the composition on a release paper or film). High viscosity oil 18 may be added at various locations in the process. For example, oil may be injected at barrels located about 3/10 L/D and 7/10 L/D as shown in FIG. 2.

In one or more embodiments, extrudable adhesive 30 may be extruded through a die 48. The die may positioned directly to or adjacent to extruder 40, or additional extruders (not shown) may be employed. The die may be used to form a generally planar extrudate that may be deposited onto a release paper of film 49. The resulting laminate (i.e. adhesive deposited onto release paper or film) may then be wound for subsequent storage, transport, and use.

Ingredient Amounts

In one or more embodiments, the compositions of the present invention may be prepared by providing to the reactor at least 25 percent by weight, in other embodiments at least 30 percent by weight, and in other embodiments at least 35 percent by weight halogenated butyl rubber based on the total weight of the composition. In these or other embodiments, the compositions of the present invention can be prepared by providing less than 60 percent by weight, in other embodiments less than 55 percent by weight, and in other embodiments less than 50 percent by weight halogenated butyl rubber based on the total weight of the composition. In one or more embodiments, the amount of butyl rubber fed to the reactor may be from about 25 to about 60, in other embodiments from about 30 to about 50, and in other embodiments from about 35 to about 55 percent by weight, based upon the total weight of the composition.

In one or more embodiments, the compositions of the present invention can be prepared, particularly in those embodiments employing an in-line manufacturing technique, by providing to the reactor at least 1 percent by weight, in other embodiments at least 2 percent by weight, and in other embodiments at least 4 percent by weight of the first phenolic resin (reactive resin) based on the total weight of the composition. In these or other embodiments, the compositions of the present invention can be prepared by providing less than 30 percent by weight, in other embodiments less than 20 percent by weight, and in other embodiments less than 15 percent by weight first phenolic resin (reactive resin) based on the total weight of the composition. In one or more embodiments, the amount of first phenolic resin fed to the reactor may be from about 1 to about 30, in other embodiments from about 2 to about 20, and in other embodiments from about 4 to about 15 percent by weight, based upon the total weight of the composition.

In one or more embodiments, the compositions of the present invention can be prepared, particularly in those embodiments employing an in-line manufacturing technique, by providing to the reactor at least 5 percent by weight, in other embodiments at least 6 percent by weight, and in other embodiments at least 7 percent by weight second phenolic resin (non-reactive resin) based on the total weight of the composition. In these or other embodiments, the compositions of the present invention may be prepared by providing to the reactor less than 15 percent by weight, in other embodiments less than 12 percent by weight, and in other embodiments less than 10 percent by weight second phenolic resin (non-reactive resin) based on the total weight of the composition. In one or more embodiments, the amount of second phenolic resin fed to the reactor may be from about 5 to about 15, in other embodiments from about 6 to about 12, and in other embodiments from about 7 to about 10 percent by weight, based upon the total weight of the composition.

Where a master-batch manufacturing technique is employed, the compositions may be prepared by providing to a first reactor at least 10 percent by weight, in other embodiments at least 12 percent by weight, and in other embodiments at least 15 percent by weight second phenolic resin (non-reactive resin) based on the total weight of the masterbatch. In these or other embodiments, the masterbatch may be prepared by providing to the reactor less than 22 percent by weight, in other embodiments less than 20 percent by weight, and in other embodiments less than 18 percent by weight second phenolic resin (non-reactive resin) based on the total weight of the masterbatch. Upon adding the masterbatch to the reactor where the polyurethane is formed, additional amounts of the second phenolic resin may be added; for example, additional phenolic resin may be added in an amount up to 10 weight percent, in other embodiments up to 7 weight percent, and in other embodiments up to 4 weight percent based upon the entire weight of the composition. In one or more embodiments, the amount of second phenolic resin used to prepare the master-batch may be from about 10 to about 22, in other embodiments from about 12 to about 20, and in other embodiments from about 15 to about 18 percent by weight, based upon the total weight of the masterbatch.

In one or more embodiments, the compositions of the present invention include at least 1 in other embodiments at least 2, and in other embodiments at least 4 percent by weight isocyanate based on the total weight of the composition. In these or other embodiments, the compositions of the present invention include less than 10 in other embodiments less than 8, and in other embodiments less than 6 percent by weight isocyanate based on the total weight of the composition. In one or more embodiments, the amount of isocyanate fed to the reactor may be from about 1 to about 10, in other embodiments from about 2 to about 8, and in other embodiments from about 4 to about 6 percent by weight, based upon the total weight of the composition.

In one or more embodiments, the compositions of the present invention include at least 0.25 in other embodiments at least 0.3, and in other embodiments at least 0.4 percent by weight metal oxide based on the total weight of the composition. In these or other embodiments, the compositions of the present invention include less than 0.6 in other embodiments less than 0.8, and in other embodiments less than 1.0 percent by weight metal oxide based on the total weight of the composition. In one or more embodiments, the amount of metal oxide fed to the reactor may be from about 0.25 to about 1.0, in other embodiments from about 0.3 to about 0.8, and in other embodiments from about 0.4 to about 0.6 percent by weight, based upon the total weight of the composition.

In one or more embodiments, the compositions of the present invention include at least 50 ppm, in other embodiments at least 100 ppm, and in other embodiments at least 150 ppm polyurethane catalyst based on the total weight of the composition. In these or other embodiments, the compositions of the present invention include less than 5,000 ppm, in other embodiments less than 4,000 ppm, and in other embodiments less than 3,000 ppm polyurethane catalyst based on the total weight of the composition. In one or more embodiments, the amount of polyurethane catalyst fed to the reactor may be from about 50 to about 5,000 ppm, in other embodiments from about 100 to about 4,000 ppm, and in other embodiments from about 150 to about 3,000 ppm, based upon the total weight of the composition. In one or more embodiments, the polyurethane catalyst can be delivered to the crosslinkable blend or partially-crosslinked rubber as an oil solution or slurry. This blend or slurry may include from about 0.5 to about 10 weight percent, in other embodiments from about 0.8 to about 5 weight percent, and in other embodiments from 1 to 2 weight percent of the polyurethane catalyst, with the balance including an oil.

In one or more embodiments, the compositions of the present invention include at least 15 in other embodiments at least 20, and in other embodiments at least 25 percent by weight oil based on the total weight of the composition. In these or other embodiments, the compositions of the present invention include less than 55 in other embodiments less than 45, and in other embodiments less than 35 percent by weight oil based on the total weight of the composition. In one or more embodiments, the amount of oil fed to the reactor may be from about 15 to about 55, in other embodiments from about 20 to about 45, and in other embodiments from about 25 to about 35 percent by weight, based upon the total weight of the composition.

In one or more embodiments, the compositions of the present invention include at least 0.1 in other embodiments at least 0.5, and in other embodiments at least 1 percent by weight filler based on the total weight of the composition. In these or other embodiments, the compositions of the present invention include less than 5.0 in other embodiments less than 3.0, and in other embodiments less than 2.5 percent by weight filler based on the total weight of the composition. In one or more embodiments, the amount of filler fed to the reactor may be from about 0.1 to about 5.0, in other embodiments from about 0.5 to about 3.0, and in other embodiments from about 1 to about 2.5 percent by weight, based upon the total weight of the composition.

Product Characteristics

Advantageously, the adhesive composition demonstrates desirable tack and strength without the need for further curing the composition.

In one or more embodiments, the composition of the present invention may be characterized by including at least two phases at standard pressure and temperature. The first phase includes polyurethane domains and the second phase includes a butyl rubber matrix, wherein the polyurethane domains are dispersed in the butyl rubber matrix.

In one or more embodiments, the composition may be characterized by butyl rubber molecules that may be crosslinked through phenolic crosslinks where methylene bridges or chemical bonds are formed between the butyl rubber molecules. In these or other embodiments, the butyl rubber molecules may be crosslinked or chemically bonded to the polyurethane molecules. In one or more embodiments, these crosslinks may exist as methylene bridges or crosslinks to the butyl rubber, and where a hydroxyl group of the phenolic resin forms a polyurethane linkage between the phenolic resin and the polyurethane.

In one or more embodiments, the composition of the present invention may include at least 35% by weight, in other embodiments at least 40% by weight, and in other embodiments at least 45% by weight butyl rubber, based upon the entire weight of the composition. In these or other embodiments, the composition may include less than 65% by weight, in other embodiments less than 60% by weight, and in other embodiments less than 55% by weight butyl rubber, based upon the entire weight of the composition. In one or more embodiments, the amount of butyl rubber within the composition may be from about 35 to about 65, in other embodiments from about 45 to about 60, and in other embodiments from about 40 to about 55 percent by weight, based upon the total weight of the composition.

In one or more embodiments, the composition may include at least 8% by weight, in other embodiments at least 10% by weight, and in other embodiments at least 12% by weight polyurethane, based upon the entire weight of the composition. In these or other embodiments, the composition may include less than 20% by weight, in other embodiments less than 18% by weight, and in other embodiments less than 16% by weight polyurethane, based on the entire weight of the composition. In one or more embodiments, the amount of polyurethane within the composition may be from about 8 to about 20, in other embodiments from about 10 to about 18, and in other embodiments from about 12 to about 16 percent by weight, based upon the total weight of the composition.

In one or more embodiments, the composition may include at least 25% by weight, in other embodiments at least 30% by weight, and in other embodiments at least 35% by weight oil and other additives, based upon the entire weight of the composition. In these or other embodiments, the composition may include less than 55% by weight, in other embodiments less than 50% by weight, and in other embodiments less than 45% by weight oil and other additives, based upon the entire weight of the composition. In one or more embodiments, the amount of oil within the composition may be from about 25 to about 55, in other embodiments from about 30 to about 50, and in other embodiments from about 35 to about 45 percent by weight, based upon the total weight of the composition.

In one or more embodiments, the polyurethane domains may be characterized, at standard pressure and temperature, by a mean particle diameter of from about 0.1 μm to about 10 μm, in other embodiments from about 0.2 μm to about 5 μm, and in other embodiments from about 0.5 μm to about 2 μm.

In one or more embodiments, these discrete domains exist within the composition up to a temperature of about 37° C., in other embodiments about 55° C., in other embodiments about 80° C., in other embodiments about 100° C., and in other embodiments about 120° C. In one or more embodiments, the polyurethane domains may be co-continuous with the butyl rubber phase above these temperatures.

In one or more embodiments, the compositions may be characterized by a peel strength (ASTM D 413; aged 24 hours at room temperature and tested at room temperature) of at least 3.0 pounds per lineal inch (pli), in other embodiments at least 4.0 pli, and in other embodiments at least 4.5 pli.

In one or more embodiments, the compositions may be characterized by a peel strength (ASTM D 413; aged 24 hours at 70° C. and tested at 70° C.) of at least 1.0 pli, in other embodiments at least 1.5 pli, and in other embodiments at least 2.0 pli.

In one or more embodiments, the compositions may be characterized by a tensile strength (ASTM D 412) of at least 40 psi, in other embodiments at least 50 psi, and in other embodiments at least 55 psi.

In one or more embodiments, the compositions may be characterized by a maximum elongation (ASTM D 412) of at least 300 psi, in other embodiments at least 400 psi, and in other embodiments at least 450 psi.

In one or more embodiments, the compositions pass a dead load shear test. The dead load shear test includes measuring the separation of a test sample, and where the separation is less than ⅛" (<3.17 mm), the sample is deemed to have passed the test. The overall test sample is prepared by adhering two EPDM strips together with a 1"×1" adhesive seam sample, and the test includes placing the sample under the tension of a 300 g weight for 24 hours at 158° F. The separation is measured as the distance that the two EPDM strips separate.

INDUSTRIAL APPLICABILITY

The compositions of this invention may be used as a seam tape for roofing membranes. In particular embodiments, the roofing membranes include polymeric membranes, such as thermoset (e.g. EPDM) or thermoplastic (e.g. PVD or TPO) membranes, which are often used on flat or low-sloped roofs.

In order to demonstrate the practice of the present invention, the following examples have been prepared and tested. The examples should not, however, be viewed as limiting the scope of the invention. The claims will serve to define the invention.

EXAMPLES

Several adhesive tape compositions were prepared within a twin-screw extruder having an L/D of 50/1. The ingredients employed and the operating conditions of the extruder are set forth in Table I. As those skilled in the art will appreciate, the temperature profile within the extruder was adjusted to achieve the reported temperatures. The composition was ultimately extruded onto a release paper and the adhesive tape composition was tested for a variety of physical properties, the test results of which are also set forth in Table I.

TABLE I

| | Samples | | | | | | | | | |
|---|---|---|---|---|---|---|---|---|---|---|
| | 1 | 2 | 3 | 4 | 5 | 6 | 7 | 8 | 9 | 10 |
| Masterbatch | 49.98 | 49.98 | 49.98 | 49.98 | 49.98 | 49.98 | 49.98 | 49.98 | 0.00 | 0.00 |
| Bromobutyl Rubber | — | — | — | — | — | — | — | — | 41.67 | 41.67 |
| Polyenthlene Wax | 2.00 | 2.00 | 2.00 | 2.00 | 2.00 | 2.00 | 2.00 | 2.00 | 2.75 | 2.75 |
| Carbon Black | 0.75 | 0.75 | 0.75 | 0.75 | 0.75 | 0.75 | 0.75 | 0.75 | 1.00 | 1.00 |
| Organomagnesium | — | — | — | — | — | — | — | — | 0.00 | 1.18 |
| Antioxidant | 0.20 | 0.20 | 0.20 | 0.20 | 0.20 | 0.20 | 0.20 | 0.20 | 0.25 | 0.25 |
| Unfunctionalized Phenolic Resin | 3.16 | 3.16 | 3.16 | 3.16 | 3.16 | 3.16 | 3.16 | 3.16 | 8.34 | 8.34 |
| High Viscosity Polybutene Oil | 33.35 | 30.35 | 30.35 | 29.35 | 29.35 | 31.35 | 31.35 | 33.35 | 29.39 | 30.31 |
| Diisocyanate | 1.50 | 2.00 | 2.00 | 2.50 | 2.50 | 1.50 | 1.50 | 1.50 | 5.00 | 5.00 |
| Aromatic Oil | 1.50 | 2.00 | 2.00 | 2.50 | 2.50 | 1.50 | 1.50 | 1.50 | 5.00 | 5.00 |
| Functionalized Phenolic Resin I | — | — | — | — | — | — | — | — | 2.00 | 0.00 |
| Functionalized Phenolic Resin II | — | — | — | — | — | — | — | — | 0.00 | 2.00 |
| Amine Catalyst I | — | 3.00 | 3.00 | 3.00 | 3.00 | 3.00 | 3.00 | — | 3.00 | 0.00 |
| Amine Catalyst II | 1.00 | — | — | — | — | — | — | 1.00 | 0.00 | 0.90 |
| Calcium Oxide | 1.56 | 1.56 | 1.56 | 1.56 | 1.56 | 1.56 | 1.56 | 1.56 | 1.60 | 1.60 |
| Tackifier Resin | 5.00 | 5.00 | 5.00 | 5.00 | 5.00 | 5.00 | 5.00 | 5.00 | — | — |
| Total | 100.00 | 100.00 | 100.00 | 100.00 | 100.00 | 100.00 | 100.00 | 100.00 | 100.00 | 100.00 |
| Temperature (° F.), Actual | | | | | | | | | | |
| Zone 1 | 103 | 109 | 111 | 111 | 110 | 110 | 110 | 100 | 103 | 104 |
| Zone 2 | 229 | 231 | 233 | 228 | 229 | 229 | 229 | 220 | 220 | 220 |
| Zone 3 | 226 | 231 | 215 | 211 | 232 | 229 | 217 | 200 | 211 | 214 |
| Zone 4 | 216 | 230 | 199 | 200 | 248 | 224 | 190 | 208 | 208 | 213 |
| Zone 5 | 229 | 230 | 194 | 190 | 227 | 229 | 205 | 200 | 190 | 203 |
| Zone 6 | 200 | 197 | 182 | 181 | 197 | 201 | 171 | 178 | 179 | 182 |
| Zone 7 | 199 | 192 | 180 | 180 | 201 | 200 | 175 | 180 | 180 | 183 |
| Zone 8 | 201 | 210 | 177 | 179 | 192 | 200 | 172 | 180 | 181 | 177 |
| Zone 9 | 193 | 214 | 184 | 179 | 198 | 199 | 185 | 185 | 181 | 179 |
| Die | 229 | 233 | 233 | 229 | 227 | 227 | 225 | 240 | 230 | 245 |
| AMP | 26.5 | — | 27.4 | 26.7 | 27.1 | 26.6 | 26.5 | 25.3 | 27.2 | 27.2 |
| Screw speed, rpm | 299.0 | 300.0 | 299.0 | 299.0 | 299.0 | 299.0 | 299.0 | 299.0 | 300.0 | 299.0 |
| Torque, % | 44.0 | — | 46.0 | 43.0 | 42.0 | 44.0 | 40.0 | 31.0 | 43.0 | 43.0 |
| Power, KW | 2.2 | — | 2.4 | 2.2 | 2.3 | 2.2 | — | 1.8 | 2.2 | 2.2 |
| Vac, psi | 29.0 | — | 29.0 | 29.0 | 29.0 | 29.0 | 29.0 | 29.0 | 29.0 | 29.0 |
| Die pressure, psi | 697.0 | — | 707.0 | 676.0 | 808.0 | 688.0 | — | 372 | 849.0 | 719.0 |
| Lab 1 Test | — | — | — | — | — | — | — | — | — | — |
| Dead Weight Shear (158° F., mm) | 2.00 | 2.30 | 1.10 | 3.40 | 2.80 | 2.60 | 2.70 | 4.30 | 2.00 | 3.00 |
| Failure type of DWS | — | — | — | — | — | — | — | — | — | — |
| Peel Adhesion (1D 158° F./158° F., pli)[1] | 2.28 | 2.56 | 3.40 | 3.68 | 2.62 | 2.77 | 2.91 | 2.58 | — | — |
| Failure type of Peel | 3A, 2B | 5A | 5A | 5A | 5A | 5A | 1A, 4B | 5A | — | — |
| Peel Adhesion (1D 158° F./158° F., pli)[1] | — | — | — | — | — | — | — | — | 1.11 | 1.05 |
| Failure type of Peel | — | — | — | — | — | — | — | — | 4A, 1B | 5A |
| Tensile (psi) | 207 | 233 | 234 | 261 | 196 | 278 | 253 | 244 | 113 | 201 |
| Thickness (in) | 0.035 | 0.038 | 0.038 | 0.035 | 0.034 | 0.036 | 0.035 | 0.034 | 0.036 | 0.036 |
| 100% Modulus (psi) | 92 | 82 | 73 | 88 | 110 | 105 | 76 | 74 | 49 | 95 |
| 200% Modulus (psi) | 148 | 150 | 131 | 154 | 158 | 185 | 134 | 133 | 68 | 143 |
| 300% Modulus (psi) | 149 | 196 | 177 | 209 | 113 | 237 | 186 | 178 | 89 | 177 |
| Elongation @ Max load (%) | 559 | 525 | 589 | 592 | 355 | 445 | 594 | 554 | 622 | 415 |

[1]Different Primers Employed

The solids ingredients, which included the rubber (or masterbatch), wax, carbon black, organomagnesium, antioxidant, phenolic resins (functionalized and unfunctionalized), calcium oxide, and tackifier resin, were added to the feed throat of the extruder. The pelletized ingredients were added by way of a pellet feeder and the powdered ingredients were added by way of a powder feeder. In general, all of the solids ingredients were added gravimetrically through a single hopper and the powder feeder and/or pellet feeder were used up stream of the gravimetric feeder to combine and disperse the ingredients prior to gravimetric feeding. The rubber (or masterbatch) was added first followed by the other solids ingredients. The liquid ingredients, including those ingredients dissolved or dispersed in oil, were added downstream at various locations. For example, the high viscosity polybutene oil was added at the third and seventh barrels by injection into the extruder. The diisocyanate, which was dissolved or dispersed in the aromatic oil, was injected at the fifth barrel, and the amine catalyst, which was likewise dispersed in an oil, was injected at the third barrel.

The masterbatch was a blend of bromobutyl rubber and a non-functionalized phenolic resin obtained under the tradename SB-1068 (SI Group); the masterbatch included 16.67 parts by weight phenolic resin per 100 parts by weight rubber. The bromobutyl rubber was obtained under the tradename Bromobutyl X-2 (Lanxess). The polyethylene was obtained under the tradename Akrowax PE-LM (AkroChem). The carbon black was obtained under the tradename Black Pearls 880 (Cabot). The organomagnesium was obtained under the tradename TS33-59 (Resinall). The antioxidant was obtained under the tradename Anox 20 (Chemtura). The unfunctionalized phenolic resin was obtained under the tradename SP-1068 (SI Group). The high viscosity polybutene oil was obtained under the tradename Indapol H-300 (INEOS). The diisocyanate was obtained under the tradename Rubinate 9433 (Huntsmen). The aromatic oil was obtained under the tradename HB-40 (Solutia). The functionalized phenolic resin I was obtained under the tradename SP1045 (SI Group). The functionalized phenolic resin II was obtained under the tradename SP1055 (SI Group). The amine catalyst I was a triethylenediamine, which included 3.3% amine in Ruetasolv DI (Rutgers). The amine catalyst II was a triethylenediamine, which included 22% amine and neophenyl in Indapol H25 (INEOS). The tackifier resin was an aliphatic dicyclopentadiene hydrocarbon resin, obtained under the tradename FT-11-46 (Neville Chemicals).

The dead weight shear was obtained on a test sample that included two EPDM strips together with a 1"×1" adhesive seam sample, and the test included placing the sample under the tension of a 300 g weight for 24 hours at 158° F. The separation of the sample is reported in millimeters. Peel adhesion was determined according to ASTM D413 after aging at 70° C. for 24 hours with testing occurring at 70° C. Different primers were used as indicated in the table. Tensile, modulus, and elongation were determined according to ASTM D412.

Various modifications and alterations that do not depart from the scope and spirit of this invention will become apparent to those skilled in the art. This invention is not to be duly limited to the illustrative embodiments set forth herein.

What is claimed is:

1. A phase-separated polymeric composition comprising:
   i. a first phase including polyurethane domains; and
   ii. a second phase including a butyl rubber matrix, wherein the polyurethane includes mer units deriving from a phenolic resin and mer units deriving from a diisocyanate, wherein said polyurethane domains are discrete domains within said butyl rubber matrix at a temperature of up to about 80° C. and the polyurethane domains have a mean particle diameter of less than 10 μm, and wherein the polyurethane domains are bonded to the butyl rubber through a phenolic resin couple.

2. The composition of claim 1, where the composition further comprises an oil.

3. The composition of claim 1, where the composition further comprises a tackifier resin.

4. The composition of claim 1, where the said polyurethane domains are discrete domains within said butyl rubber matrix at a temperature of up to about 37° C.

5. The composition of claim 1, where the polyurethane domains have a mean particle diameter of 0.1 to 10 μm.

6. The composition of claim 1, where the butyl rubber is crosslinked.

7. The composition of claim 2, where the composition further comprises a tackifier resin.

8. The composition of claim 1, where the composition demonstrates tack.

9. The composition of claim 1, where the composition includes at least 35% by weight butyl rubber, based upon the entire weight of the composition.

10. The composition of claim 9, where the composition includes at least 8% by weight polyurethane based upon the entire weight of the composition.

11. The composition of claim 1, where the composition includes at least 45% by weight butyl rubber, based upon the entire weight of the composition.

12. The composition of claim 11, where the composition includes at least 12% by weight polyurethane based upon the entire weight of the composition.

13. The composition of claim 1, where the composition demonstrates a peel strength (ASTM D413; aged 24 hours at room temperature and tested at room temperature) of at least 3.0 pounds per lineal inch.

14. The composition of claim 1, where the composition demonstrates a peel strength (ASTM D413; aged 24 hours at room temperature and tested at room temperature) of at least 4.0 pounds per lineal inch.

* * * * *